(12) United States Patent
Do et al.

(10) Patent No.: US 9,870,054 B2
(45) Date of Patent: Jan. 16, 2018

(54) TACTILE SUPPLY DEVICE

(71) Applicant: CK MATERIALS LAB CO., LTD., Seoul (KR)

(72) Inventors: Seoung Hun Do, Seoul (KR); Hyeong Jun Kim, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

(21) Appl. No.: 14/778,722

(22) PCT Filed: Nov. 14, 2014

(86) PCT No.: PCT/KR2014/010977
§ 371 (c)(1),
(2) Date: Sep. 21, 2015

(87) PCT Pub. No.: WO2016/052802
PCT Pub. Date: Apr. 7, 2016

(65) Prior Publication Data
US 2016/0239086 A1   Aug. 18, 2016

(30) Foreign Application Priority Data

Sep. 29, 2014 (KR) .......................... 10-2014-0130155
Nov. 13, 2014 (KR) .......................... 10-2014-0157999

(51) Int. Cl.
*G06F 3/01* (2006.01)
*G08B 6/00* (2006.01)
(Continued)

(52) U.S. Cl.
CPC .............. *G06F 3/016* (2013.01); *G06F 3/046* (2013.01); *G08B 6/00* (2013.01); *H01F 7/126* (2013.01)

(58) Field of Classification Search
CPC ... G06F 3/01; G06F 3/016; G08B 6/00; H01F 7/126
See application file for complete search history.

(56) References Cited

U.S. PATENT DOCUMENTS 9,390,676 B2 * 7/2016 Nieves ..................... G06F 3/016
2010/0079410 A1 * 4/2010 Minton ..................... G06F 3/016
345/175

(Continued)

FOREIGN PATENT DOCUMENTS

JP        2008522312        6/2008
KR    1020100082459        7/2010
(Continued)

OTHER PUBLICATIONS

International Search Report—PCT/KR2014/010977 dated Jun. 22, 2015.
(Continued)

*Primary Examiner* — Bernard Rojas
(74) *Attorney, Agent, or Firm* — Cantor Colburn LLP

(57) ABSTRACT

Provided is a tactile sensation supply device for transferring various types of tactile sensations to a user using tactile sensation providers that include magnetic particles. The tactile sensation supply device includes tactile sensation providers made of magnetic particles and a matrix material, and a magnetic field generator for generating a magnetic field to transform the tactile sensation providers.

15 Claims, 15 Drawing Sheets

(51) Int. Cl.
*H01F 7/126* (2006.01)
*G06F 3/046* (2006.01)

(56) References Cited

U.S. PATENT DOCUMENTS

| | | | |
|---|---|---|---|
| 2010/0302199 | A1 | 12/2010 | Taylor et al. |
| 2011/0261021 | A1* | 10/2011 | Modarres ................ G06F 3/016 345/177 |
| 2012/0015149 | A1* | 1/2012 | Keefe .................... B29C 59/02 428/152 |
| 2014/0104047 | A1 | 4/2014 | Bolzmacher et al. |
| 2016/0211736 | A1* | 7/2016 | Moussette ............... G06F 3/016 |

FOREIGN PATENT DOCUMENTS

| | | |
|---|---|---|
| KR | 1020110118584 | 10/2011 |
| KR | 1020120030202 | 3/2012 |
| KR | 1020120071895 | 7/2012 |

OTHER PUBLICATIONS

European Search Report—European Application No. 14893686.7, dated Feb. 8, 2017, citing US 2014/104047 US 2010/302199.

* cited by examiner

Magnetic field lines (a)

(b)

(a)

(b)

TACTILE SUPPLY DEVICE

TECHNICAL FIELD

The present invention relates to a tactile sensation supply device and, more particularly, to a tactile sensation supply device for providing various types of tactile sensation to a user by using a material that includes magnetic particles and whose shape changes in response to an externally applied magnetic field.

BACKGROUND ART

Haptics refer to a technology about tactile sensation and, more particularly, to a technology for allowing a user of an electronic device to feel touch, forces, motion, etc. through a keyboard, a mouse, a joystick, a touchscreen, or the like. Although visual information accounted for most of the information exchanges between electronic devices and people in the past, the haptic technology currently attracts attention with regard to providing more detailed and realistic information.

In general, an inertial actuator, a piezoelectric actuator, an electroactive polymer (EAP) actuator, an electrostatic actuator, etc. are used for the haptic technology. Examples of the inertial actuator include an eccentric motor that vibrates by an eccentric force generated by the rotation of the motor, and a linear resonant actuator (LRA) that maximizes the vibrational intensity by resonant frequencies. The piezoelectric actuator is in the shape of a beam or a disk and is driven by a piezoelectric element whose size or shape changes instantaneously in response to an electric field. The EAP actuator generates vibration by repeated movements of a mass attached to an EAP film. The electrostatic actuator is driven by an attractive force generated between two oppositely charged glass sheets and a repulsive force generated when the glass sheets have charges with the same polarity.

Korean Patent Publication No. 10-2011-0118584 (entitled "Transparent composite piezoelectric combined touch sensor and haptic actuator") discloses conventional haptic devices, and FIG. 1 is a perspective view of a conventional haptic device.

In the haptic device, a layer configured to serve as a sensor and a layer configured to serve as an actuator may be combined into a single module in the form of a composite piezoelectric actuator/sensor cell. Here, FIG. 1 illustrates the cross section of a composite piezoelectric actuator/sensor cell 5 together with associated electrodes 6. The composite piezoelectric cell 5 includes an array of piezoceramic fibers 7a in a structural adhesive 7b such as an epoxy material. Each of the electrodes 6 may be used to send an individual control signal so that each patch of the fibers 7a inserted into the structural adhesive 7b between two consecutive electrodes 6 and 6 can be actuated, thereby exerting a localized haptic effect at the corresponding location. Arrows 8 indicate how the polarized piezoceramic material expands or contracts in response to an applied electric field, and arrow 9 indicates the piezoceramic polarization produced by the electrodes 6.

However, the above-described conventional haptic technology is merely used to provide simple vibration, and therefore has limitations for providing emotional is tactile sensation or complicated text information. Accordingly, research needs to be conducted on a tactile supply structure capable of effectively providing emotion and complicated information as well as simply providing vibration.

DETAILED DESCRIPTION OF THE INVENTION

Technical Problem

The present invention provides a tactile sensation supply device capable of emotionally providing various types of tactile sensations.

The present invention also provides a tactile sensation supply device capable of effectively providing not only a simple signal such as an alarm but also complicated information such as texts or geometric figures as tactile information by configuring a tactile unit in the form of at least one cell.

The present invention also provides a tactile sensation supply device capable of providing a user with various types of tactile sensations such as vibration, brushing, constriction, beating, pressing, tapping or tilting using an external magnetic field, by varying the shape of tactile sensation providers formed of a material that includes magnetic particles.

The present invention also provides a tactile sensation supply device capable of providing tactile sensation to the whole or part of an electronic device and changing the location where the tactile sensation is generated depending on the situation.

The present invention also provides a tactile sensation supply device that is applicable to mobile devices, touchscreen devices, game consoles, etc. in the information technology (IT) field to provide real-time tactile sensations, applicable to driver assistance information feedback systems such as lane departure warning systems, front crash prevention systems, and overspeed protection systems, etc. in the car industry, and also applicable to pulsimeters, measurement of the pressure distribution in human teeth, surgical robots, etc. in the medical field to transfer tactile sensations effectively.

Technical Solution

According to an aspect of the present invention, there is provided a tactile is sensation supply device that includes tactile sensation providers formed of magnetic particles and a matrix material; and a magnetic field generator for generating a magnetic field in order to change the shape of the tactile sensation providers.

Advantageous Effects

According to the present invention, various types of tactile sensations may be provided emotionally.

Furthermore, by configuring a tactile unit in the form of at least one cell, not only a simple signal such as an alarm but also complicated information such as texts or geometric figures may be effectively provided as tactile information.

In addition, by changing the shape of tactile sensation providers made of a material that includes magnetic particles in response to an external magnetic field, various types of tactile sensations such as vibration, brushing, constriction, beating, pressing, tapping, or tilting, may be provided for a user.

Besides, the tactile sensation providers may provide tactile sensations to the whole or part of an electronic device and change the location where the tactile sensation is generated depending on the situation.

A tactile sensation supply device according to the present invention may be applied to mobile devices, touchscreen devices, game consoles, etc. in the information technology (IT) field to provide real-time tactile sensations, applied to driver assistance information feedback systems such as lane departure warning systems, front crash prevention systems, and overspeed protection systems, etc. in the car industry, and also applied to pulsimeters, measurement of the pressure distribution in human teeth, surgical robots, etc. in the medical field to effectively provide tactile sensations.

MODE OF THE INVENTION

The configuration and application of embodiments of the present invention will now be described in detail with reference to the accompanying drawings. The following description discloses one of various aspects of the present invention and corresponds to part of the detailed description of the present invention.

In the following description of the present invention, a detailed description of known functions and configurations incorporated herein will be omitted when it may make the subject matter of the present invention unclear.

Hereinafter, the present invention will be described in detail by explaining embodiments of the invention with reference to the attached drawings.

A tactile sensation supply device includes tactile sensation providers formed of magnetic particles and a matrix material, and a magnetic field generator that is provided under the tactile sensation providers and generating a magnetic field to transform the tactile sensation providers.

Figure 1:
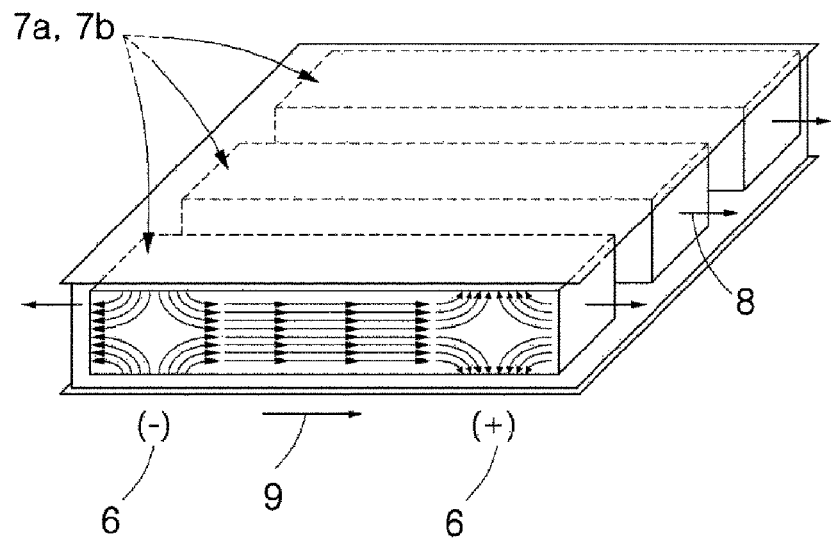
FIG. 1 is a perspective view of a conventional haptic device.
Figure 2:
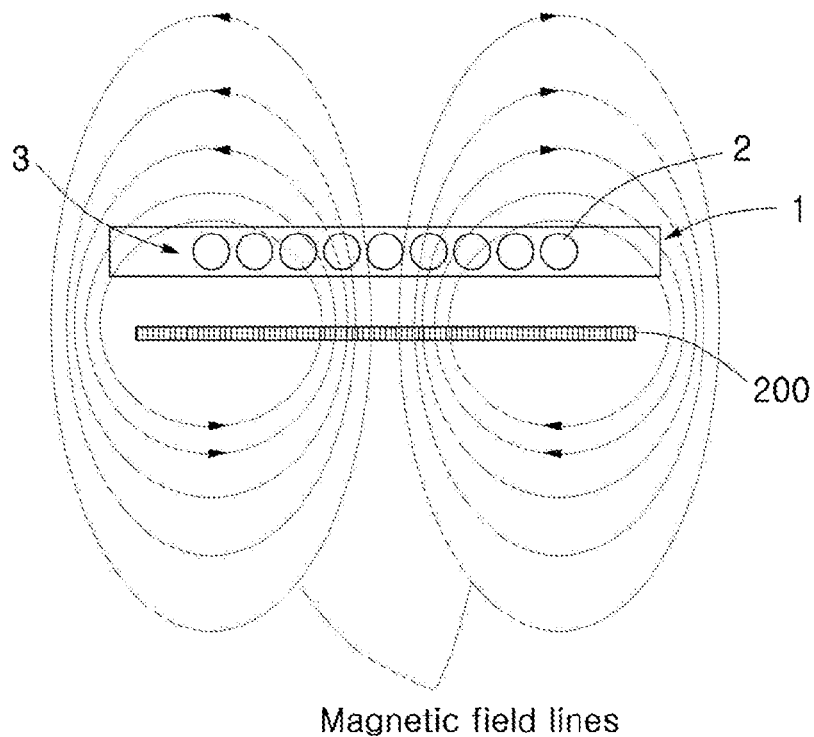
FIG. 2 is a cross-sectional view of a tactile sensation supply device according to an embodiment of the present invention.

FIG. 2 is a cross-sectional view of a tactile sensation supply device according to an embodiment of the present invention.

Referring to FIG. 2, a tactile sensation provider 1 (i.e., 10, 20, 30, 40, and 50) may include magnetic particles 2, e.g., nano- or micro-scale iron or ferrite particles, and a matrix material 3, e.g., rubber or a polymeric material. Alternatively, the tactile sensation provider 1 may include a magnetorheological elastomer (MRE). The MRE is an elastomer material including particles that are capable of responding to an external magnetic field. Since the elastomer material includes magnetic particles that are capable of being magnetized in response to an external magnetic field, the characteristics of the MRE, e.g., stiffness, tensile strength, and elongation rate, may is be changed by the application of the external magnetic field. The tactile sensation provider 1 may be in the shape of at least one of a fine projection, a polyhedron such as an empty cylinder and a dome, a plate, a seesaw, and a tunnel.

For example, the magnetic particles 2 may be iron (Fe), cobalt (Co), nickel (Ni), or ferrite particles and, preferably, carbonyl iron particles. The size of the magnetic particles 2 may range from 0.01 um to 100 um. To maximize the transformation of the tactile sensation provider 1 by the magnetic field generator 200, it is preferable that the magnetic particles 2 in the matrix material 3 have a high saturation magnetization, a high content, and a large size. The magnetic particles 2 are not limited to a specific shape but may be in the shape of a sphere, a flake with a high aspect ratio and a magnetic anisotropy, or the like.

The matrix material 3 preferably has a high elasticity to maximize the transformation and restoring force of the tactile sensation provider 1. Furthermore, the elongation and tensile strength of the matrix material may be adjusted to enhance the durability.

The magnetic field generator 200 is provided above or under the tactile sensation provider 1 and generates a magnetic field, to which the magnetic particles 2 in the tactile sensation provider 1 respond. At least one of a planar coil and a solenoid coil is used as the magnetic field generator 200, which generates an alternating-current (AC) magnetic field when an alternating current having a size and shape corresponding to the tactile sensation provider 1 is applied and generates a direct-current (DC) magnetic field when a direct current is applied. Particularly, FIG. 2 schematically illustrates the magnetic field lines of the magnetic field that is generated by the magnetic field generator 200.

The magnetic field generator 200 has a location and shape corresponding to the tactile sensation provider 1. The shape of the tactile sensation provider 1 may be changed in response to the magnetic field generated by the magnetic field to generator 200, and tactile sensations may be transferred through the transformation of the tactile sensation provider 1. Here, the tactile sensation may be at least one of vibration, brushing, constriction, beating, pressing, tapping, and tilting.

Figure 3:
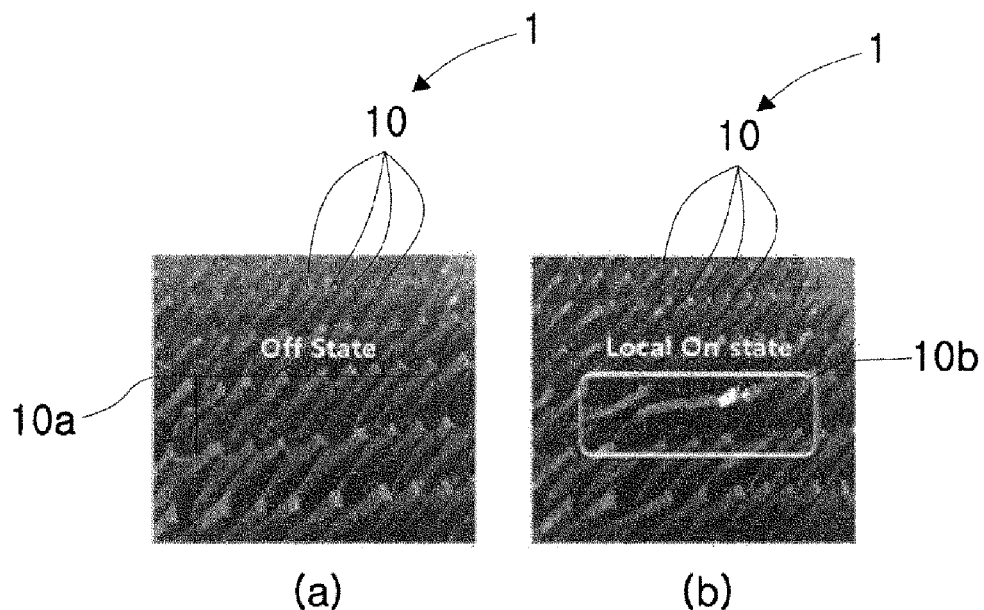
FIG. 3 illustrates the change of the shape of a tactile sensation provider in response to an external magnetic field, according to an embodiment of the present invention.
Figure 4:
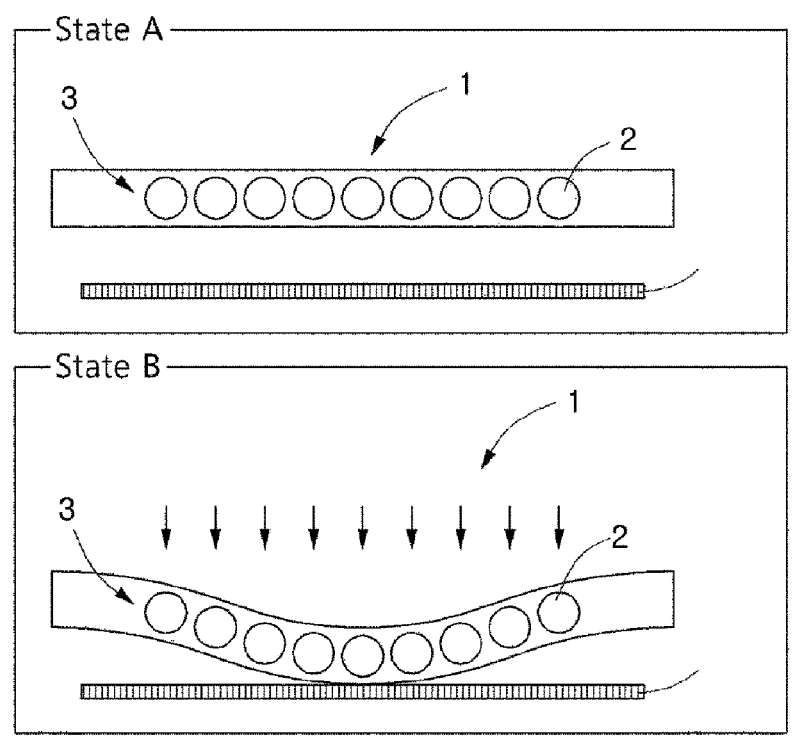
FIG. 4 illustrates the change of the shape of the tactile sensation provider, according to an embodiment of the present invention.

FIGS. 3 and 4 illustrate the transformation of the tactile sensation provider 1, according to embodiments of the present invention.

The tactile sensation provider 1 may be transformed to form different shapes depending on the influence of an external magnetic field.

Referring to (a) of FIG. 3, when a plurality of tactile sensation providers 1 is not influenced by an external magnetic field (Off State), in other words, when a magnetic field is not generated by a coil unit 210 (see FIG. 8), which is described below, of the magnetic field generator 200, the plurality of tactile sensation providers 1 may have a first shape 10a.

Referring to (b) of FIG. 3, when part of the plurality of tactile sensation providers 1 is influenced by an external magnetic field (Local On State), in other words, when a magnetic field is generated by the coil unit 210 (see FIG. 8), which is described below, of the magnetic field generator 200, the part of the plurality of tactile sensation providers 1 may have a second shape 10b.

FIG. 4 specifically shows the shapes of the magnetic particles 2 and the matrix material 3 of the tactile sensation provider 1 depending on whether or not a magnetic field is generated by the magnetic field generator 200.

Here, State A is a state in which electric current is not applied to the magnetic field generator 200 (i.e., a state in which no magnetic field is generated), and shows an initial shape (a first shape) of the tactile sensation provider 1. State B is a state in which electric current is applied to the magnetic field generator 200 (i.e., a state in which a magnetic field is generated), and shows a transformed shape (a second shape) in which the tactile sensation provider 1 is bent upward or downward in response to the magnetic field. The transformation from the first shape to the second shape may be repeated to produce a reciprocating motion, thereby transferring vibrational sensations.

State A of FIG. 4 may correspond to the state of (a) of FIG. 3, and State B of FIG. 4 may correspond to the state of (b) of FIG. 3. Likewise, the reciprocating motion from the first shape 10a to the second shape 10b may be equally implemented by applying a direct current or an alternating current with a certain frequency to the magnetic field generator 200 to switch on/off the magnetic field generator 200. The shape of the tactile sensation provider 1 may be changed when the magnetic particles 2 of the tactile sensation provider 1 are magnetized by or respond to a magnetic field generated by the magnetic field generator 200.

Hereinafter, modifications of the shape of the tactile sensation provider 1 according to embodiments of the present invention will be described in detail.

Figure 5:
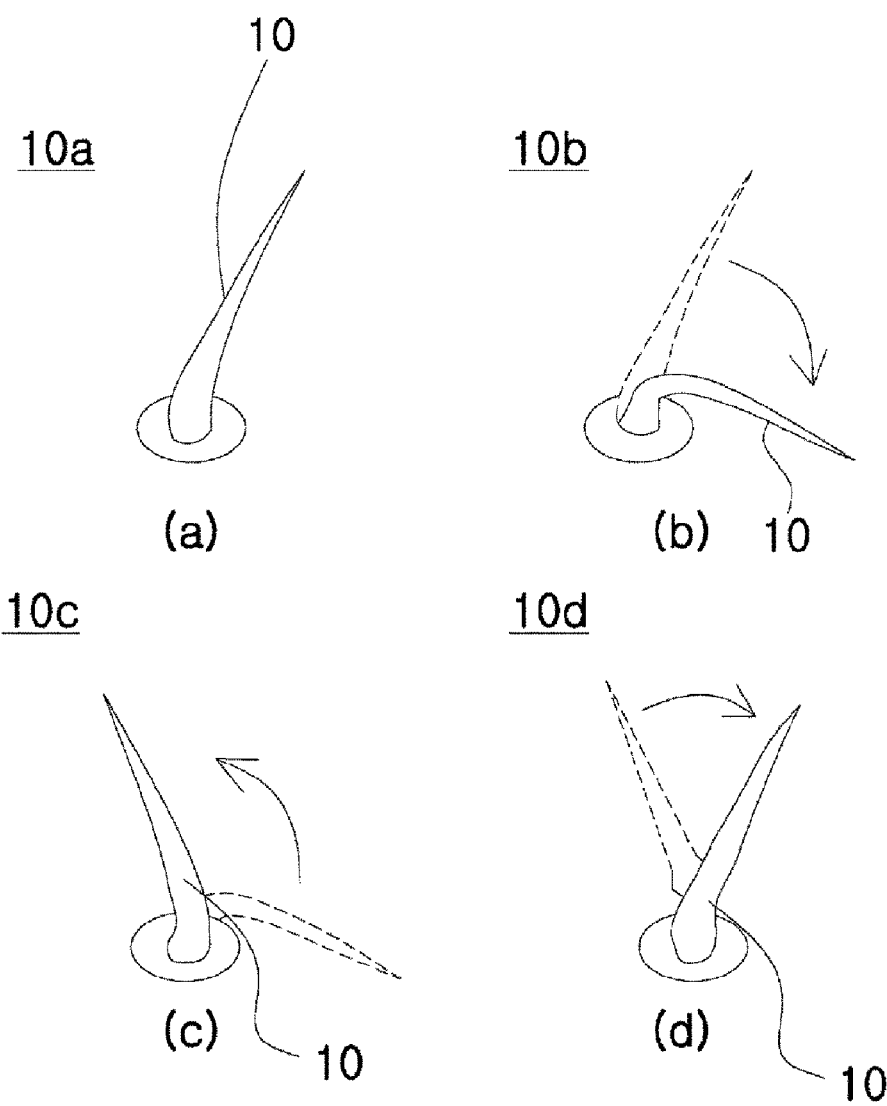
FIG. 5 illustrates the process of providing a tactile sensation by a tactile sensation provider in response to an external magnetic field, according to a first embodiment of the present invention.
Figure 6:
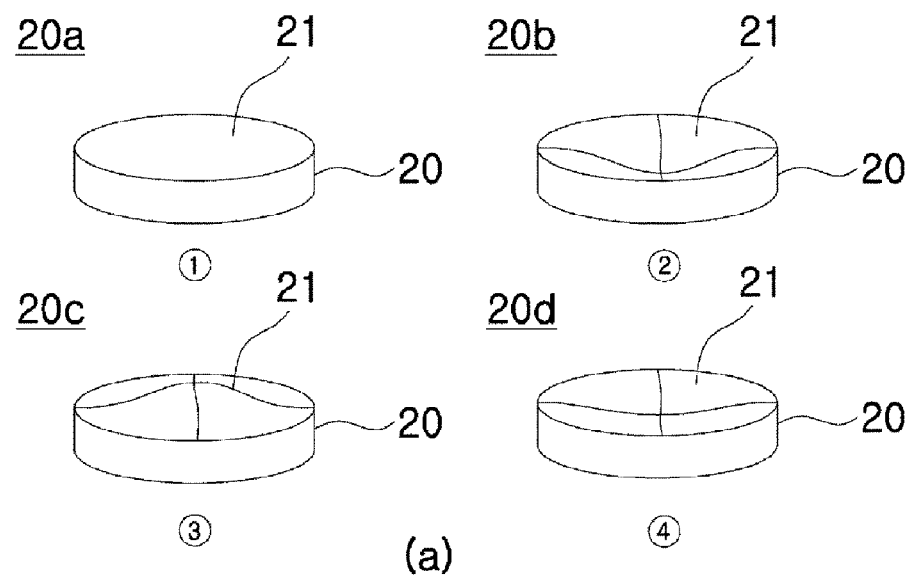
FIG. 6 illustrates the process of providing a tactile sensation by a tactile sensation provider in response to an external magnetic field, according to a second embodiment of the present invention.
Figure 6:
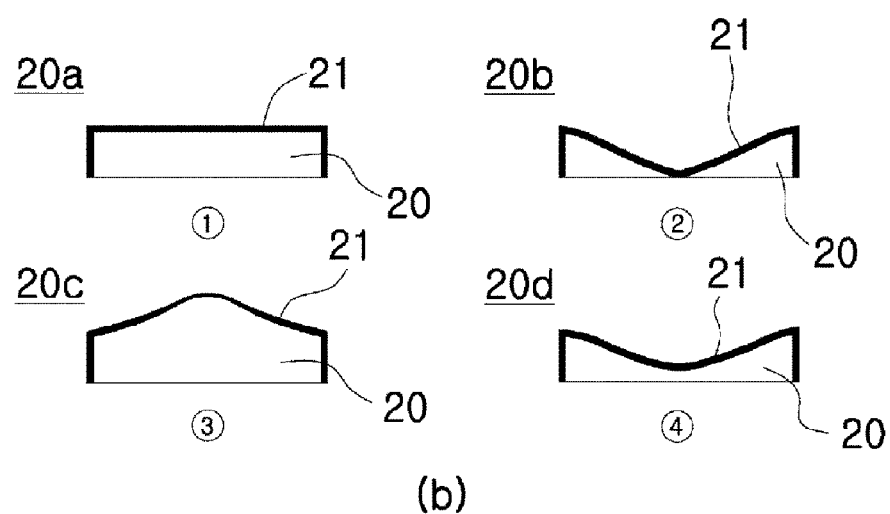
Figure 7:
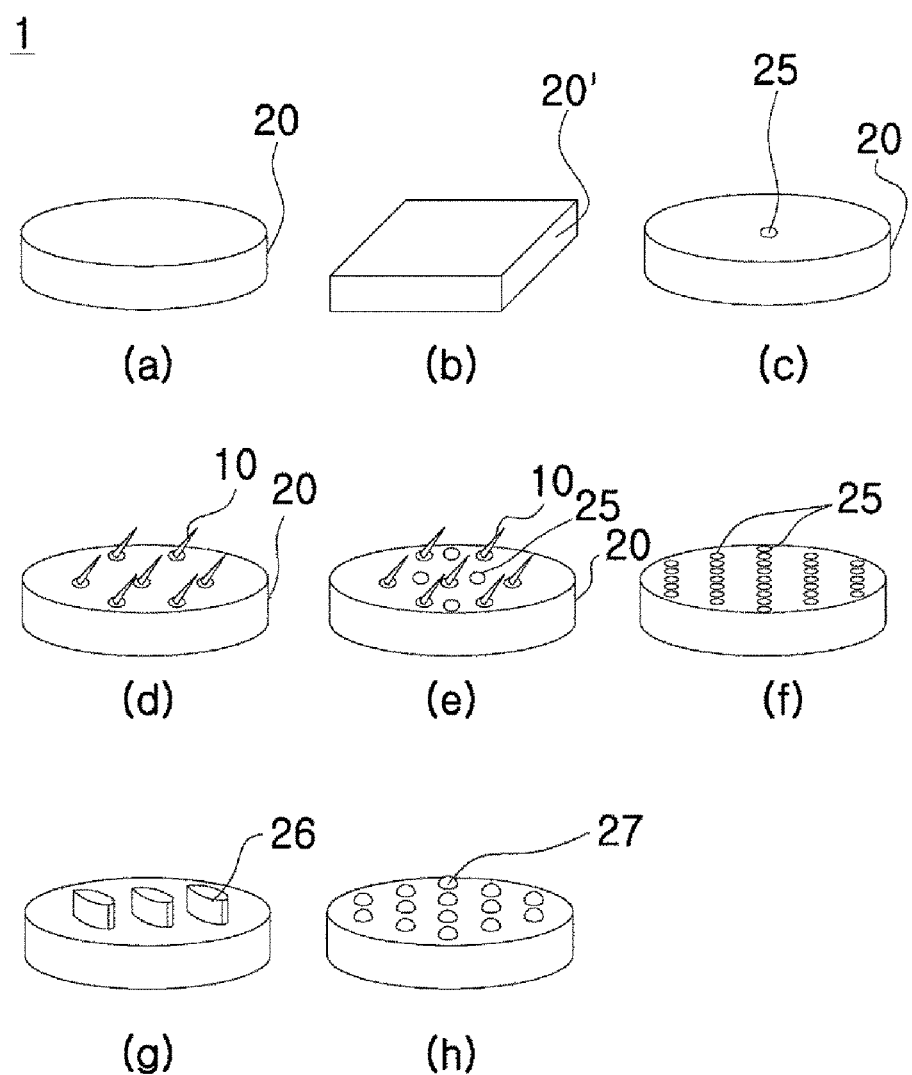
FIG. 7 illustrates various shapes of the tactile sensation provider, according to an embodiment of the present invention.

FIG. 5 illustrates the process of providing a tactile sensation by a tactile sensation provider 10 in response to an external magnetic field, according to a first embodiment of the present invention, FIG. 6 illustrates the process of providing a tactile sensation by a tactile sensation provider 20 in response to an external magnetic field, according to a second embodiment of the present invention, and FIG. 7 illustrates various shapes of the tactile sensation provider 1, according to an embodiment of the present invention.

Referring to FIG. 5, the tactile sensation provider 1 may be in the shape of a fine projection 10. The thickness of the fine projection 10 may be equal to or smaller than about 25 μm, similar to the fleece of a sheep, or may be equal to or smaller than about 100 μm, similar to human hair, to provide tactile sensations precisely and emotionally.

As shown in (a) of FIG. 5, when not influenced by an external magnetic field, the fine projection 10 may remain slightly inclined (or the first shape 10a). Alternatively, the fine projection 10 may remain straight and vertical without inclination. Then, as shown in (b) of FIG. 5, when influenced by an external magnetic field, the fine projection 10 may remain further inclined or even horizontal (or the second shape 10b). Then, as shown in (c) and (d) of FIG. 5, when not affected by the external magnetic field after the application of the magnetic field is ceased, the fine projection 10 may return from the second shape 10b to the first shape 10a and produce a reciprocating motion 10c and 10d by its own elastic force (or restoring force). Accordingly, a tactile sensation similar to brushing or tickling may be transferred by the fine projection 10 moving in the reciprocating motion 10c and 10d.

Referring to FIG. 6, the tactile sensation provider 1 may be in the shape of an empty cylinder 20, a dome or a polyhedron 20' (see (b) of FIG. 7). (a) of FIG. 6 is a perspective view of the tactile sensation provider 1 in the shape of the cylinder 20, and (b) of FIG. 6 is a vertical cross-sectional view of the tactile sensation provider 1 in the shape of the cylinder 20.

When not influenced by an external magnetic field, the empty cylinder 20 may have a top surface 21, which is flat (or a first shape 20a) as indicated by ①. Then, is when influenced by an external magnetic field, the top surface 21 of the cylinder 20 may subside into the empty internal space (or a second shape 20b) as indicated by ②. Then, when not affected by the external magnetic field after the application of the magnetic field is ceased, the cylinder 20 may return from the second shape 20b to the first shape 20a and produce a reciprocating motion 20c and 20d by its own elastic force (or restoring force), as indicated by ③ and ④. Accordingly, a tactile sensation similar to tapping may be transferred by the top surface 21 moving in the reciprocating motion 20c and 20d.

At least one of the degree (amount), direction, and frequency of the transformation from the first shape 10a or 20a to the second shape 10b or 20b of the tactile sensation provider 1 can be controlled by controlling at least one of the intensity, direction and frequency of a magnetic field generated by the magnetic field generator 200. For example, if a stronger magnetic field is applied, the fine projections 10 will be inclined more or the top surface 21 of the cylinder 20 will subside more, thereby transferring stronger tactile sensations. Furthermore, if the frequency of the magnetic field is changed, the speed of transformation of the fine projections 10 or the cylinder 20 from the first shape 10a or 20a to the second shape 10b or 20b and then back to the first shape 10a or 20a also changes, thereby transferring various types of tactile sensations.

Referring to FIG. 7, the tactile sensation provider 1 may be in the shape of the fine projection 10, the empty cylinder 20, a dome, the polyhedron 20', or various combinations thereof.

(1) (a) of FIG. 7 shows the empty cylinder 20, (2) (b) of FIG. 7 shows an empty hexahedron 20' (or polyhedron 20'), (3) (c) of FIG. 7 shows the empty cylinder 20 with a top surface wherein micro-holes 25 are provided, capable of increasing the durability of the tactile sensation provider 1 by allowing air to smoothly enter and exit through the micro-holes 25 while the top surface moves in the reciprocating motion 20c and 20d of FIG. 6, (4) (d) of FIG. 7 shows a combined shape of the fine projections 10 and the empty cylinder 20, (5) (e) of FIG. 7 shows a shape identical to the shape of (d) of FIG. 7, except that a plurality of micro-holes 25 are provided in the top surface of the cylinder 20, (6) (f) of FIG. 7 shows a shape identical to the shape of is (c) of FIG. 7, except that a plurality of micro-holes 25 are provided, (7) (g) of FIG. 7 shows the empty cylinder 20 with a top surface wherein various structures 26 (e.g., empty cylinders smaller than the cylinder 20) are combined, and (8) (h) of FIG. 7 shows the empty cylinder 20 with a top surface wherein dome-shaped embossed structures 27 are provided.

As described above, according to the present invention, various types of tactile sensations such as brushing, tickling, tapping, etc. may be transferred in multiple ways by configuring the tactile sensation provider 1 in various shapes.

Figure 8:
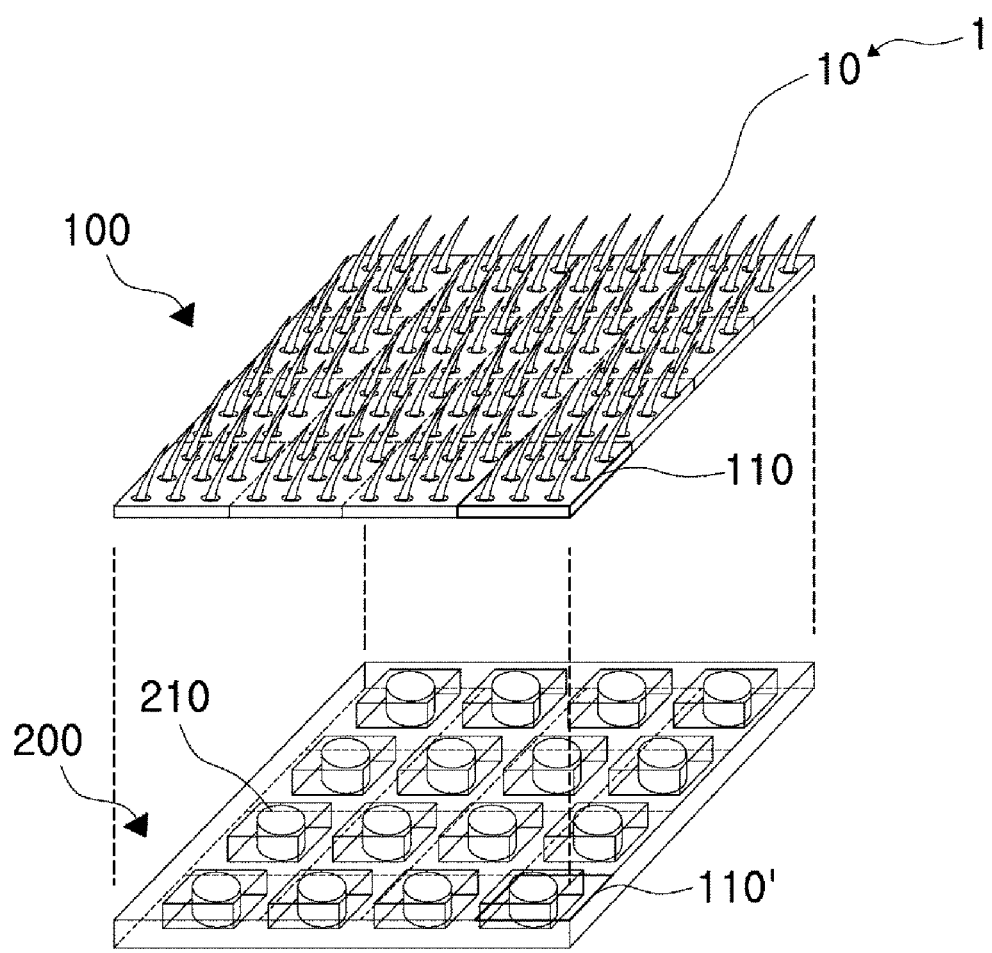
FIG. 8 is a perspective view of the whole tactile sensation supply device, according to an embodiment of the present invention.
Figure 9:
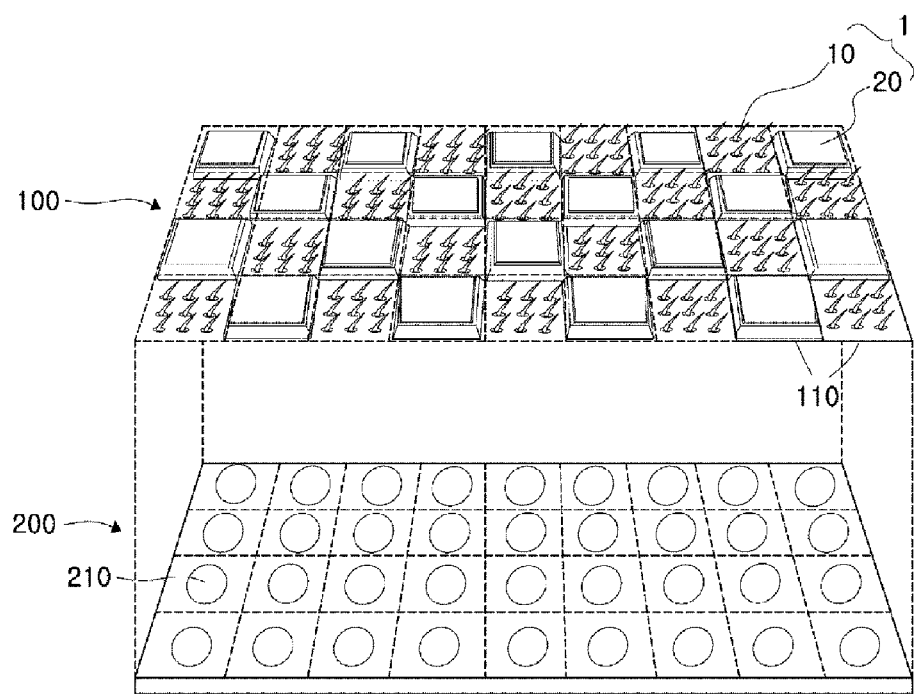
FIG. 9 is a perspective view of a tactile unit including a plurality of cells, according to an embodiment of the present invention.

FIG. 8 is a perspective view of the whole tactile sensation supply device, according to an embodiment of the present invention, and FIG. 9 is a perspective view of a tactile unit 100 including a plurality of cells 110, according to an embodiment of the present invention.

Referring to FIG. 8, the tactile sensation supply device according to an embodiment of the present invention includes the tactile unit 100 and the magnetic field generator 200 and the tactile unit 100 includes at least one tactile sensation provider 1.

The tactile unit 100 is a part that actually contacts a user of the tactile sensation supply device and transfer tactile sensations. The tactile unit 100 may include at least one cell 110. The size of the cell 110 may be appropriately determined in consideration of the size of the tactile unit 100, the resolution of tactile sensation to be transferred, etc.

The cell 110 may include at least one tactile sensation provider 1. The cell 110 may include one or more types of the tactile sensation provider 1. As shown in FIG. 9, each cell 110 may include various types of the tactile sensation providers 1, e.g., the fine projections 10 and the empty cylinders 20.

The magnetic field generator 200 may generate a magnetic field and include at least one coil unit 210. It is preferable that the magnetic field generator 200 is to provided under the tactile unit 100 and each coil unit 210 (or each cell 110' including the coil unit 210) corresponds to each cell 110 of the tactile unit 100. However, the magnetic field generator 200 may be provided at locations other than under the tactile unit 100 as long as it is within a range in which each coil unit 210 can apply a magnetic field to its corresponding cell 110.

Figure 10:
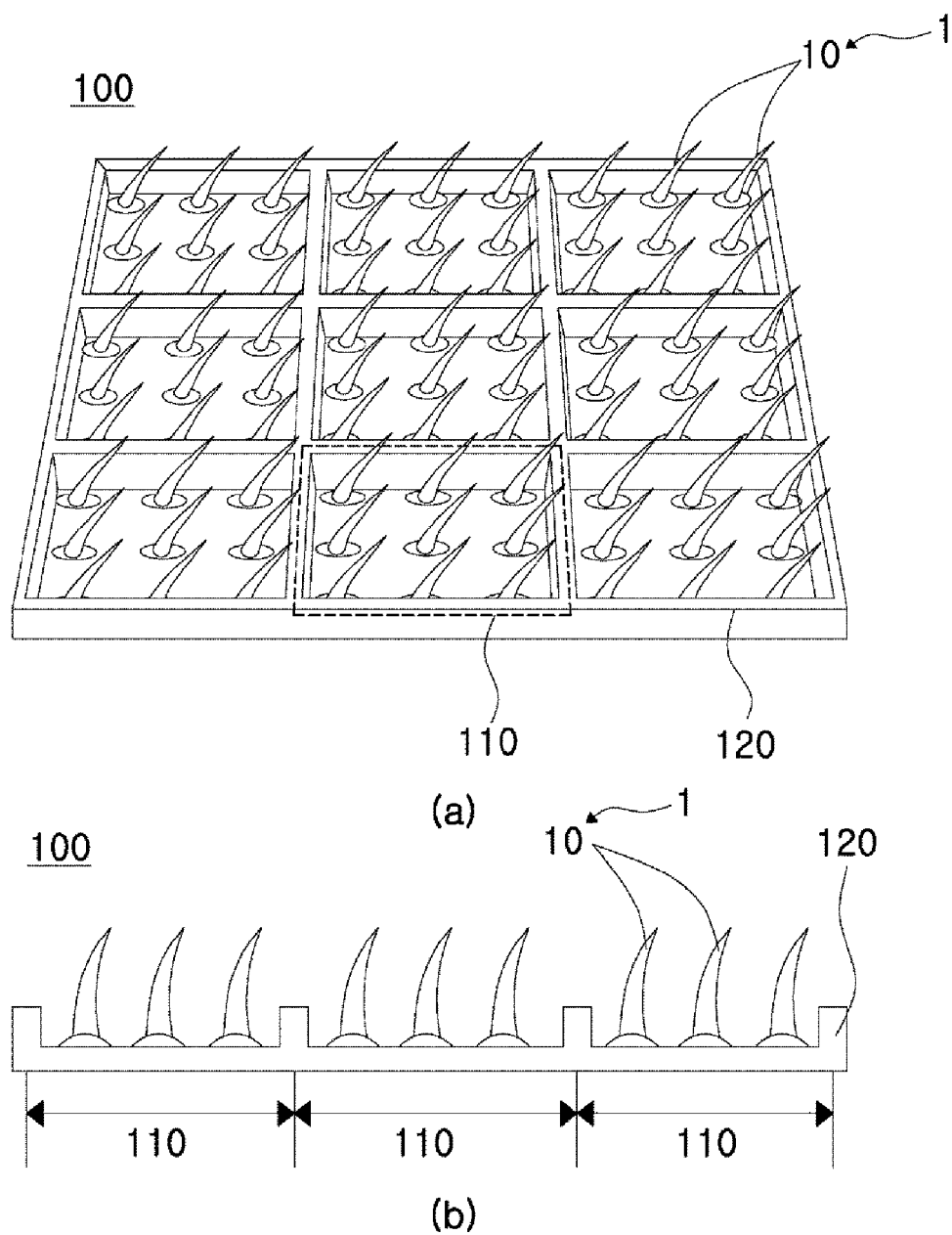
FIG. 10 illustrates a tactile unit having cell barriers, according to an embodiment of the present invention.

FIG. 10 illustrates the tactile unit 100 having cell barriers 120, according to an embodiment of the present invention.

Referring to FIG. 10, the cell barriers 120 may be provided on the tactile unit 100. The cell barriers 120 may be provided along the perimeters of the cells 110 and serves to protect the tactile sensation providers 1. It is preferable that the cell barriers 120 have a height lower than that of the tactile sensation providers 1 such that the tactile sensation providers 1 are protected and efficiently transfer tactile information at the same time.

For example, assuming that the tactile unit 100 is configured as the cells 110 having the fine projections 10, a user of the tactile sensation supply device may press the fine projections 10 too hard while the user receives tactile information. In this case, it is problematic that the fine projections 10 may be left flat and therefore broken or the durability of the fine projections 10 may be deteriorated. Accordingly, if the cell barriers 120 have a height lower than the height of the fine projections 10, even when the user presses the fine projections 10 hard, the fine projections 10 may be prevented from being left flat and therefore protected. In addition, since the fine projections 10 may move as high as at least the height of the cell barriers 120, tactile information may be sufficiently transferred to the user's skin.

Meanwhile, as shown in FIG. 9, when the cells 110 include the fine projections 10 and the empty hexahedrons 20 or when one cell 110 includes a combination of the fine projections 10 and the empty hexahedron 20, the empty hexahedrons 20 may have a height lower than that of the fine projections 10 and therefore serve in a similar manner as the cell barriers 120 do, without the cell barriers 120.

Figure 11:
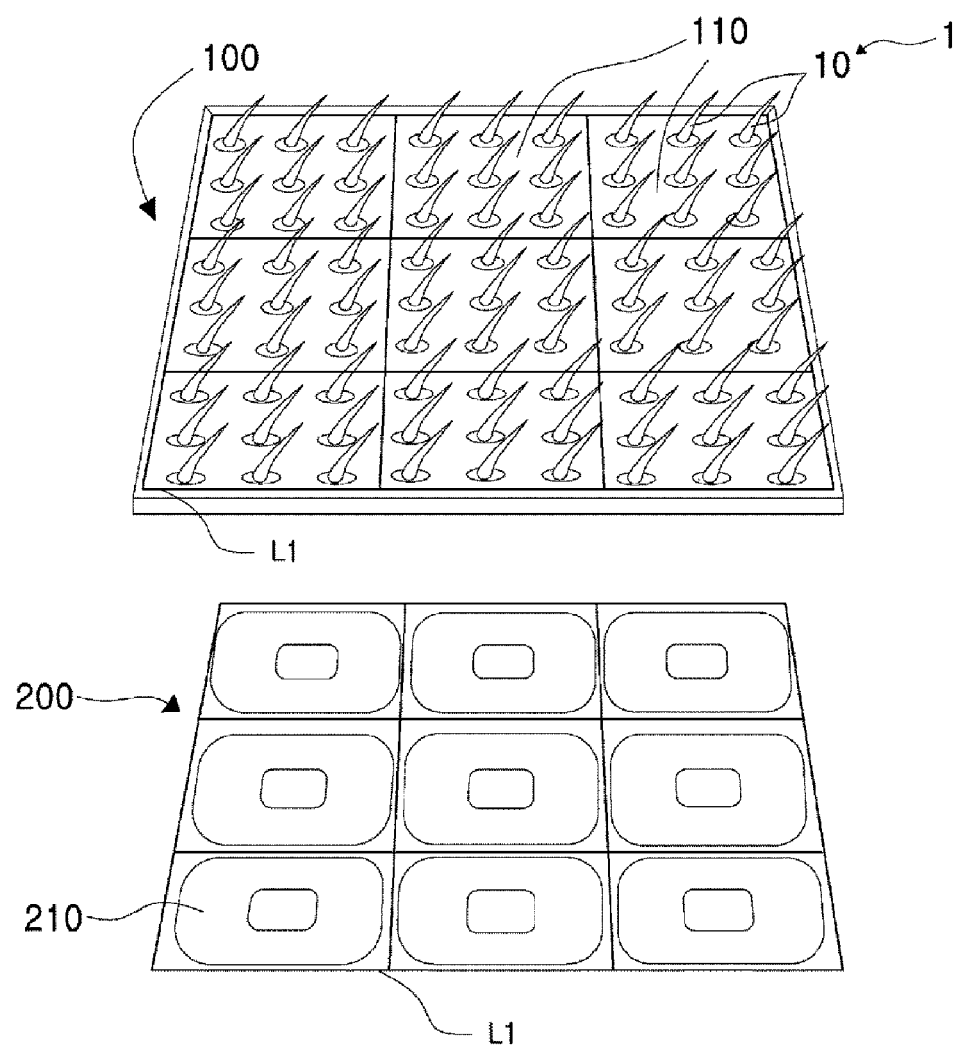
FIG. 11 is a view showing the alignment of coil units of a magnetic field generator, according to an embodiment of the present invention.
Figure 12:
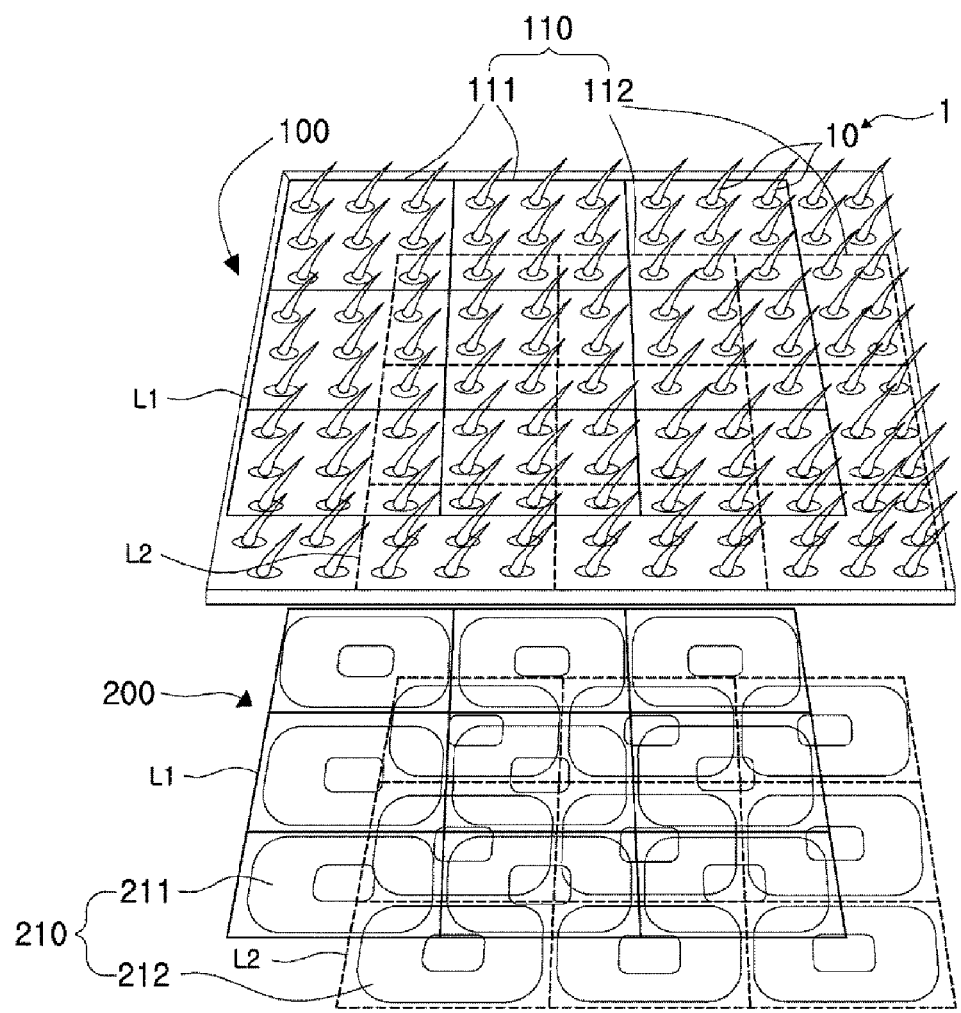
FIG. 12 is a view showing the alignment of coil units of a magnetic field generator, according to another embodiment of the present invention.

FIG. 11 is a view showing the alignment of the coil units 210, according to an embodiment of the present invention, and FIG. 12 is a view showing the alignment of the coil units 210: 211 and 212 according to another embodiment of the present invention.

Referring to FIG. 11, the tactile sensation supply device according to an embodiment of the present invention may include the tactile unit 100 having a plurality of cells 110 in a 3×3 matrix, and the magnetic field generator 200 having a plurality of coil units 210 in a 3×3 matrix. The cells 110 and the coil units 210 in a range L1 may correspond to each other, and therefore the number of the cells 110 and the number of coil units 210 are the same. The coil units 210 may be provided as a single layer (e.g., FIG. 11) or multiple layers (e.g., FIG. 12) in the magnetic field generator 200. Each cell 110 of the tactile unit 100 may include a plurality of fine projections 10 in a 3×3 matrix.

In the tactile sensation supply device of FIG. 11, when a magnetic field is generated by one coil unit 210, at least one fine projections 10 provided on a cell 110 that corresponds to the coil unit 210 may be transformed from the first shape 10a to the second shape 10b. When the magnetic field generated by the coil unit 210 is dissipated, the fine projections 10 on the cell 110 corresponding to the coil unit 210 return from the second shape 10b to the first shape 10a.

Referring to FIG. 12, the tactile sensation supply device according to another embodiment of the present invention may include the coil units 210 provided as multiple layers 211 and 212 in the magnetic field generator 200. The cells 111 in a 3×3 matrix and the coil units in a 3×3 matrix within a virtual range L1 indicated by a solid line may correspond to each other, and the cells 112 in a 3×3 matrix and the coil units 212 in a 3×3 matrix within a virtual range L2 indicated by a dashed line may correspond to each other. The fine projections 10 in a 3×3 matrix may be provided on each cell 110 of the tactile unit 100.

In the tactile sensation supply device of FIG. 12, the coil units 211 may transform the shape of the fine projections 10 on the cells 111 within the virtual range L1 indicated by the solid line, and the coil units 212 may transform the shape of the fine projections 10 on the cells 112 within the virtual range L2 indicated by the dashed line. Therefore, the fine projections 10 in both the ranges L1 and L2 may be transformed by a plurality of coil units 211 and 212 and therefore further fine-tuned. As such, compared with the tactile sensation supply device of FIG. 11, a higher resolution may be achieved and more detailed tactile information may be provided easily.

Figure 13:
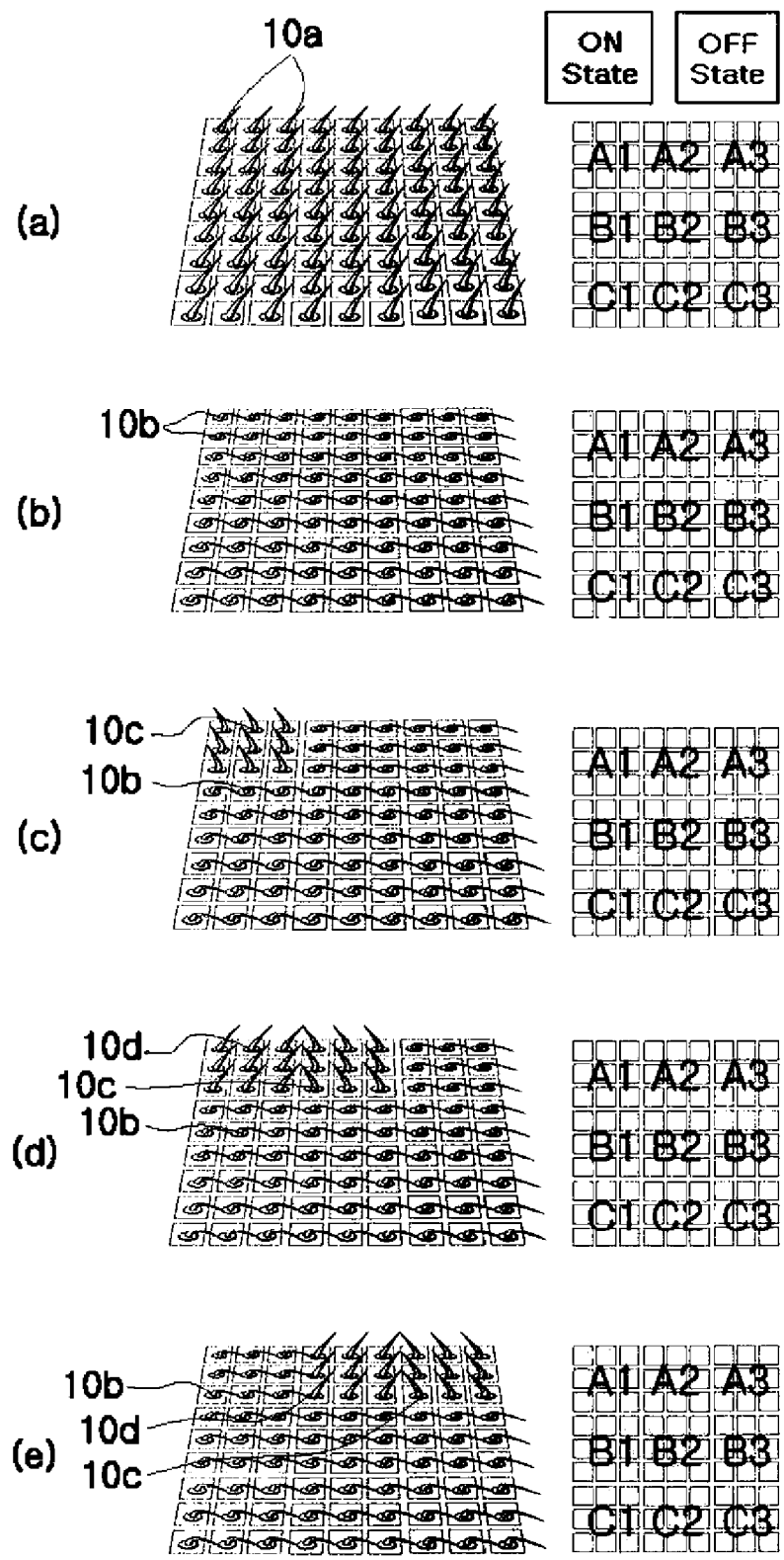
FIG. 13 illustrates the operation process of a tactile sensation supply device, according to an embodiment of the present invention.

FIG. 13 illustrates the operation process of a tactile sensation supply device, according to an embodiment of the present invention.

Referring to (a) of FIG. 13, magnetic fields are not yet applied to cells A1 to C3 on the tactile unit 100. Accordingly, all the fine projections 10 on the tactile unit 100 may maintain the first shape 10*a*.

Referring to (b) of FIG. 13, magnetic fields are applied to cells A1 to C3 on the tactile unit 100 and therefore all the fine projections 10 on the tactile unit 100 may maintained the second shape 10*b*.

Referring to (c) of FIG. 13, when only the magnetic field applied by the coil unit 210 positioned corresponding to cell A1 is ceased, only the fine projections 10 on cell A1 may return to the first shape 10*a* and produce the reciprocating motion 10*c* and 10*d* by their own elastic force (or restoring force).

Referring to (d) of FIG. 13, when only the magnetic field applied by the coil unit 210 positioned corresponding to cell A2 is ceased, only the fine projections 10 on cell A2 may return to the first shape 10*a* and produce the reciprocating motion 10*c* and 10*d* by their own elastic force (or restoring force). The reciprocating motion of the fine projections 10 on cell A1 may be weakened compared to that of the fine projections 10 on cell A2.

Referring to (e) of FIG. 13, when only the magnetic field applied by the coil unit 210 positioned corresponding to cell A3 is ceased, only the fine projections 10 on cell A3 may return to the first shape 10*a* and produce the reciprocating motion 10*c* and 10*d* by their own elastic force (or restoring force). The reciprocating motion of the fine projections 10 on cell A2 may be weakened compared to that of the fine projections 10 on cell A3. At the same time, a magnetic field may be applied again by the coil unit 210 positioned corresponding to cell A1 such that the fine projections 10 on cell A1 may maintain the second shape 10*b*.

If the application of magnetic fields are sequentially done and ceased to cells A1 and C3 as described above, the fine projections 10 on cells A1 to C3 may be transformed from the first shape 10*a* to the second shape 10*b* and then produce the reciprocating motion 10*c* and 10*d* while returning from the second shape 10*b* to the first shape 10*a*, thereby providing the user of the tactile sensation supply device with tactile information that is transferred sequentially from cell A1 to cell C3.

Figure 14:
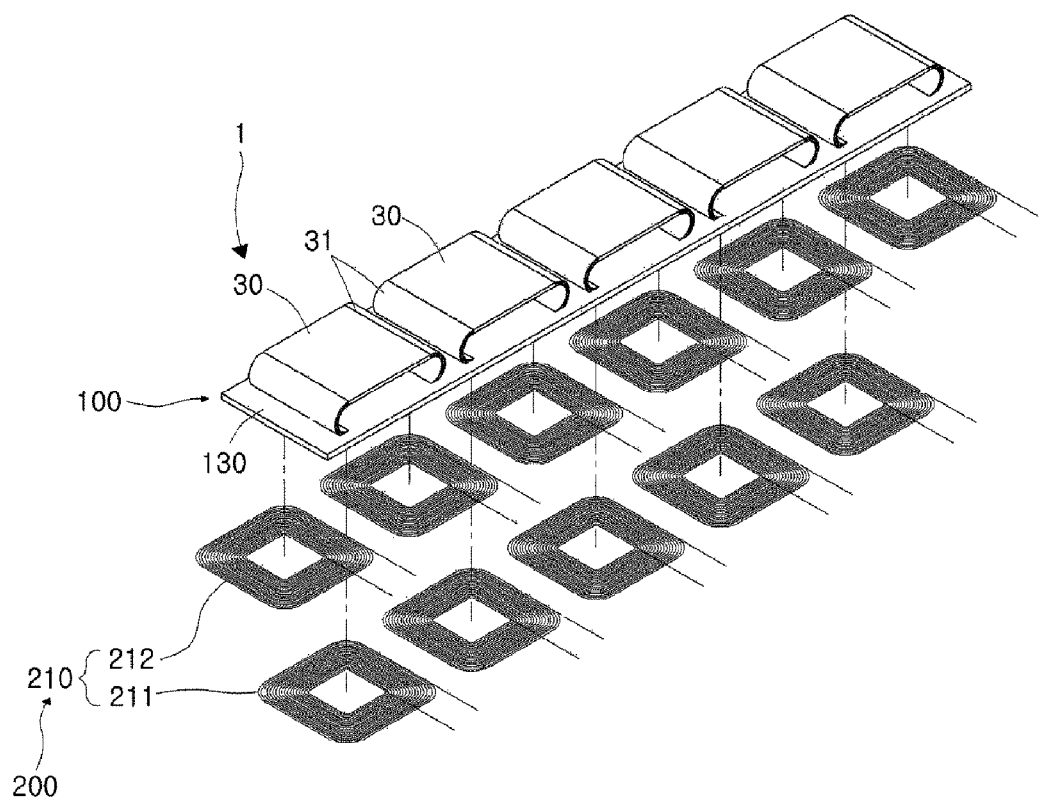
FIG. 14 is a view showing the structure of a plurality of cells configured as tactile sensation providers, according to a third embodiment of the present invention.
Figure 15:
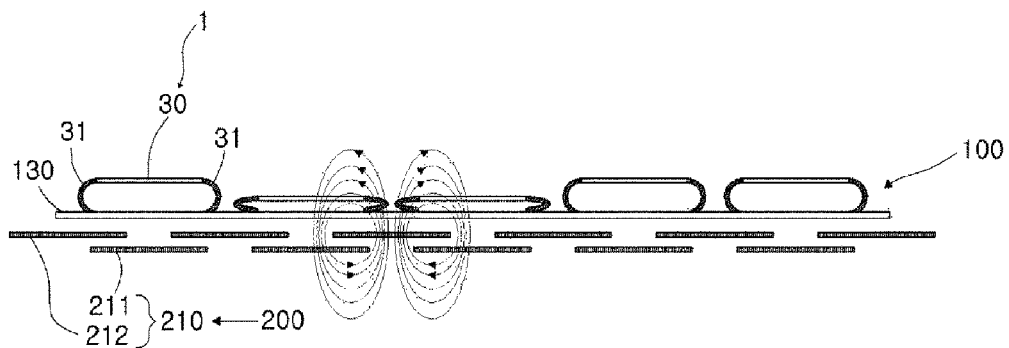
FIG. 15 is a view showing the operation of the plurality of cells configured as the tactile sensation providers, according to the third embodiment of the present invention.

FIG. 14 is a perspective view showing the structure of a plurality of cells configured as tactile sensation providers 1 (i.e., 30), according to a third embodiment of the present invention, and FIG. 15 is a cross-sectional view showing the operation of the plurality of cells configured as the tactile sensation providers 1, according to the third embodiment of the present invention.

In a tactile sensation supply device according to the third embodiment, a plurality of tactile sensation providers 1 and supporters 31 may define at least one cell, a plurality of cells may be disposed on an insulator 130 at equal distances from each other, and a plurality of coil units 210 of the magnetic field generator 200 as a single layer or multiple layers 211 and 212 may be disposed under the insulator 130 in a shape and at a location corresponding to the cells.

Here, supporters 31 and 41 (see FIGS. 14 to 17) may be understood to be components provided between the tactile sensation providers 1 (i.e., 30 and 40) and the magnetic field generator 200 to ensure operating space for the tactile sensation providers 1. The supporters 31 and 41 may be MREs and have at least one of a curved shape and a wave shape.

The tactile sensation providers 1 according to the third embodiment have a plate shape 30. The supporters 31 are formed integrally with the tactile sensation providers 1 on each side of the tactile sensation providers 1 and have a curved shape. The supporters 31 are disposed between the insulator 130 and the tactile sensation providers 1 and ensure operating space for the tactile sensation providers 1 or the supporters 31. For example, the tactile sensation providers 1 and the supporters 31 may move up and down and produce a reciprocating motion involving a change in shape in the operating space in response to a magnetic field generated by the magnetic field generator 200. The change in shape may cause the movement of one or all the cells, thereby transferring tactile sensations such as tapping to a user. Here, the tactile sensation provider 1 may be in the shape of a plurality of laminated leaf spring rather than the plate shape.

Accordingly, at least one cell may respond to the magnetic field, thereby transferring various types of tactile sensations such as vibration, beating, and tapping to the user.

Figure 16:
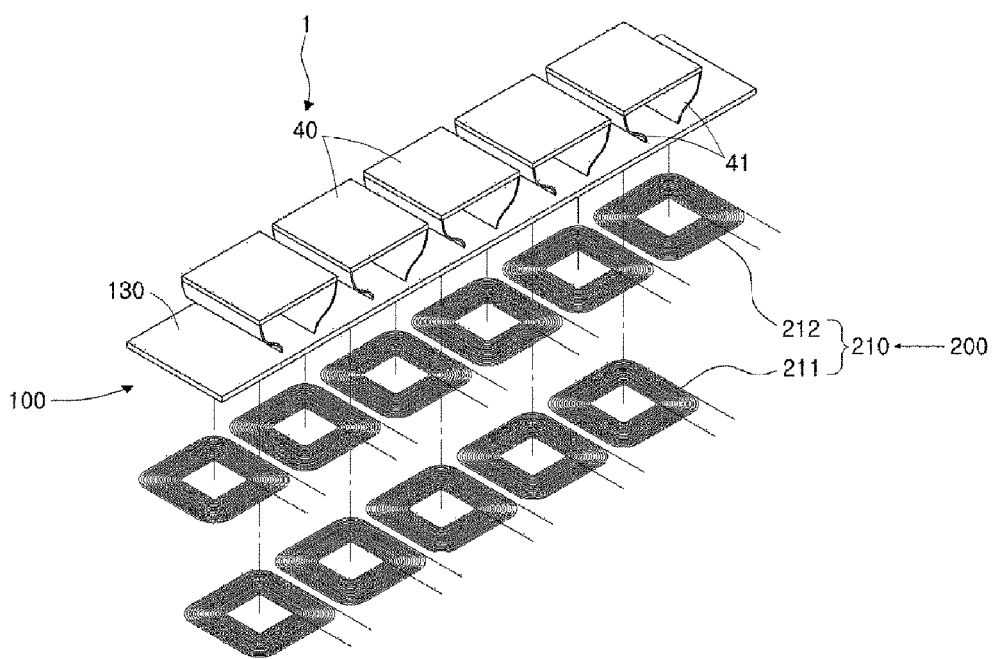
FIG. 16 is a view showing the structure of a plurality of cells configured as tactile sensation providers, according to a fourth embodiment of the present invention.
Figure 17:
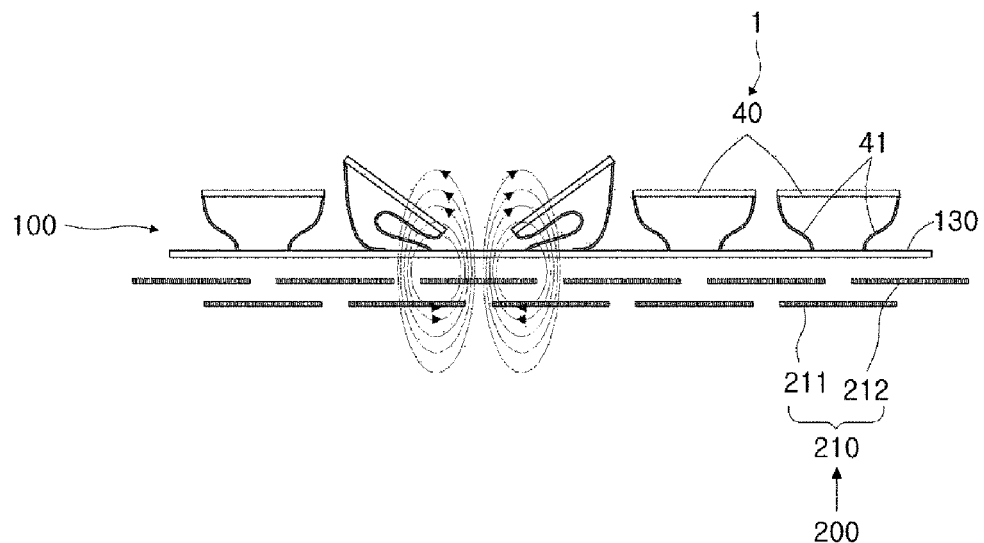
FIG. 17 is a view showing operation of the plurality of cells configured as the tactile sensation providers, according to the fourth embodiment of the present invention.

FIG. 16 is a perspective view showing the structure of a plurality of cells configured as tactile sensation providers 1 (i.e., 40), according to a fourth embodiment of the present invention, and FIG. 17 is a cross-sectional view showing the operation of the plurality of cells configured as the tactile sensation providers 1, according to the fourth embodiment of the present invention.

In a tactile sensation supply device according to the fourth embodiment, a is plurality of tactile sensation providers 1 and supporters 41 may define at least one cell, a plurality of cells may be disposed on the insulator 130 at equal distances from each other, and a plurality of coil units 210 of the magnetic field generator 200 as a single layer or multiple layers 211 and 212 may be disposed under the insulator 130 in a shape and at a location corresponding to the cells.

Here, the tactile sensation providers 1 according to the fourth embodiment have a plate shape 40. The supporters 41 are formed integrally with the tactile sensation providers 1 on each side of the tactile sensation providers 1 and have a wave shape. The supporters 41 are disposed between the insulator 130 and the tactile sensation providers 1, and ensure operating space for the tactile sensation providers 1. For example, when a magnetic field is generated by the magnetic field generator 200, the supporters 41 made of an MRE may be transformed and one end of the tactile sensation provider 1 may tilt toward the center of the magnetic field generator 200. When no magnetic field is generated by the magnetic field generator 200, the supporters 41 may return to the original shape by their own elastic force. That is, by applying a magnetic field to one or all the cells, various types of tactile sensations such as vibration, beating, tapping, and tilting may be transferred to a user.

Figure 18:
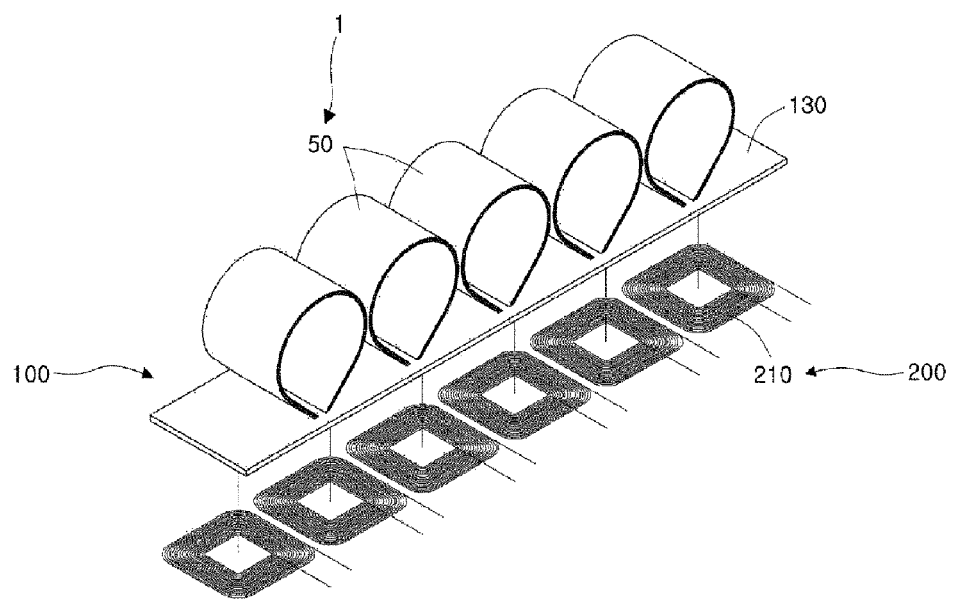
FIG. 18 is a view showing the structure of a plurality of cells configured as tactile sensation providers, according to a fifth embodiment of the present invention.
Figure 19:
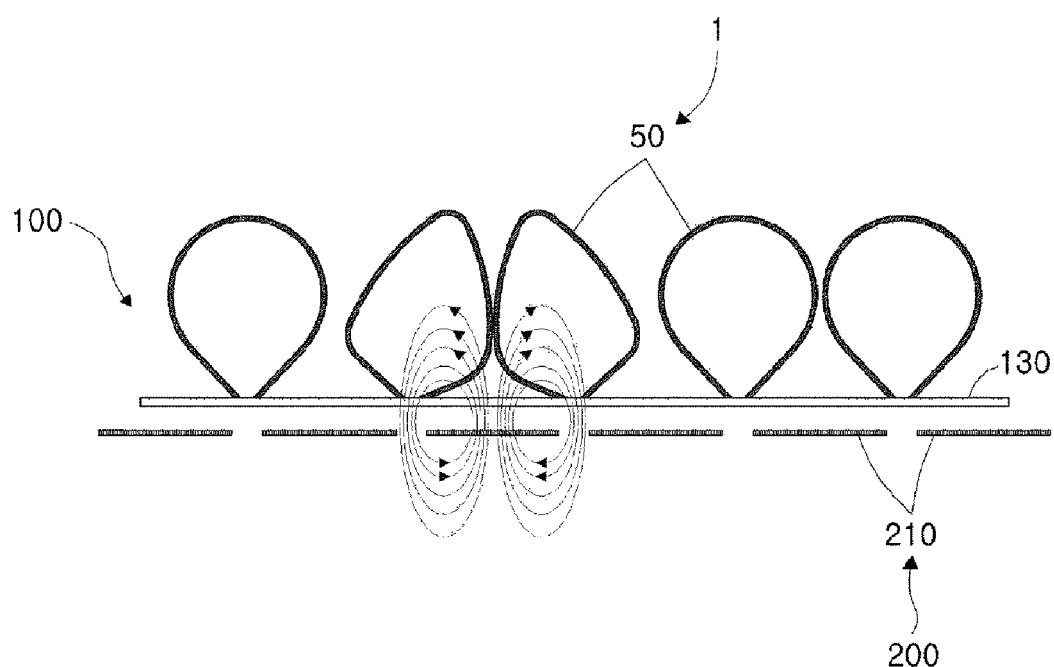
FIG. 19 is a view showing operation of the plurality of cells configured as the tactile sensation providers, according to the fifth embodiment of the present invention.

FIG. 18 is a perspective view showing the structure of a plurality of cells configured as tactile sensation providers 1 (i.e., 50), according to a fifth embodiment of the present invention, and FIG. 19 is a cross-sectional view showing the operation of the plurality of cells configured as the tactile sensation providers 1, according to the fifth embodiment of the present invention.

In a tactile sensation supply device according to the fifth embodiment, a plurality of tactile sensation providers 1 may define at least one cell, a plurality of cells may be disposed on the insulator 130 at equal distances from each other.

Furthermore, a plurality of coil units 210 of the magnetic field generator 200 as a single layer or multiple layers 211 and 212 may be disposed under the insulator 130 in shapes and at locations corresponding to the cells.

Here, the tactile sensation providers 1 according to the fifth embodiment have a tunnel shape 50 and have internal oval spaces. For example, when a magnetic field is generated by the magnetic field generator 200, the tactile sensation providers 1 made of an MRE may be transformed and one end of the tactile sensation provider 1 may move toward the center of the magnetic field generator 200. When no magnetic field is generated by the magnetic field generator 200, the tactile sensation providers 1 may return to the original shape by their own elastic force. That is, by applying a magnetic field to one or all the cells, various types of tactile sensations such as pinching and constriction may be transferred to a user.

Although the tactile sensation providers 1 are made of a material including the magnetic particles 2, a representative example of which is a magnetorheological elastomer (MRE), in the above description, the tactile sensation providers 1 may also be made of an electrorheological elastomer (ERE) and may operate equivalently by applying an external electric field by an electric field generator instead of the magnetic field generator 200.

As described above, the tactile sensation supply device according to the present invention may emotionally provide various types of tactile sensations using various types of the tactile sensation providers 1.

Furthermore, according to the present invention, by configuring the tactile unit 100 in the form of the cells 110, not only a simple vibration signal such as an alarm but also complicated information such as texts or geometric figures may be provided as tactile information. In addition, information such as text may be transferred to a location that contacts a user's skin, thereby effectively transferring secret information that is to be protected.

When the above-described tactile sensation supply device is applied in various electronic devices including a touchscreen, the tactile sensation supply device as a vibration source may provide haptic feedback to user input, be thinner and more flexible than conventional vibration motors, and achieve excellent durability and low prices compared to conventional piezoelectric or electroactive polymer (EAP)-based vibrators.

With the above-described arrangements, the tactile sensation providers 1 may be transformed to have various shapes and, in response to the application of an external magnetic field, transfer various types of tactile sensations such as vibration, brushing, constriction, beating, pressing, tapping, and tilting to a user. Furthermore, the tactile sensation providers 1 may transfer tactile sensations to the whole or part of is an electronic device and change the location where the tactile sensations are generated depending on the situation. In addition, the tactile sensation providers 1 may be applied to mobile devices, touchscreen devices, game consoles, etc. in the information technology (IT) field to provide real-time tactile sensations, applied to driver assistance information feedback systems such as lane departure warning systems, front crash prevention systems, and overspeed protection systems, etc. in the car industry, and also applied to pulsimeters, measurement of the pressure distribution in human teeth, surgical robots, etc. in the medical field to transfer tactile sensations effectively.

As described above, although the present invention has been described through the specific matters such as detailed elements, the limited embodiments, and the drawings, they are provided to help overall comprehension of the present invention, and the present invention is not limited to the above-described embodiments. It is obvious to those skilled in the art to which the present invention pertains that various changes and modifications can be made from such descriptions as described above.

Accordingly, the spirit and scope of the present invention should not be limited or determined by the above-described embodiments, and it should be noted that not only the claims which will be described below but also their equivalents fall within the spirit and scope of the present invention.

The invention claimed is:

1. A tactile sensation supply device comprising:
a plurality of tactile sensation providers made of magnetic particles and a matrix material; and
a magnetic field generator for generating a magnetic field to transform the plurality of tactile sensation providers,
wherein the plurality of tactile sensation providers maintains a first shape when not influenced by a magnetic field,
wherein the plurality of tactile sensation providers maintains a second shape when influenced by a magnetic field,
wherein the plurality of tactile sensation providers returns from the second shape to the first shape and produces a reciprocating motion by elastic force, thereby transferring a tactile sensation, and
wherein the plurality of tactile sensation providers is in the shape of at least one of a fine projection, an empty cylinder, a dome, a polyhedron, a plate, a leaf spring, a seesaw and a tunnel.

2. The tactile sensation supply device of claim 1, wherein the plurality of tactile sensation providers is made of a magnetorheological elastomer (MRE).

3. The tactile sensation supply device of claim 1, wherein the magnetic field generator is at least one of a planar coil and a solenoid coil.

4. The tactile sensation supply device of claim 1, further comprising a supporter disposed between the plurality of tactile sensation providers and the magnetic field generator to ensure a space for the transformation of the plurality of tactile sensation providers.

5. The tactile sensation supply device of claim 4, wherein the supporter is made of an MRE and has at least one of a curved shape and a wave shape.

6. The tactile sensation supply device of claim 1, further comprising a tactile unit that contacts a user, wherein at least one of the plurality of tactile sensation providers is connected to the tactile unit.

7. The tactile sensation supply device of claim 6, wherein the tactile unit includes at least one cell, and wherein the magnetic field generator is disposed under the tactile unit.

8. The tactile sensation supply device of claim 7, wherein the magnetic field generator includes at least one coil unit that corresponds to the cell.

9. The tactile sensation supply device of claim 8, wherein the coil unit is disposed as multiple layers that overlap each other.

10. The tactile sensation supply device of claim 9, wherein the tactile sensation includes at least one of vibration, brushing, constriction, beating, pressing, tapping and tilting.

11. The tactile sensation supply device of claim 6, wherein the tactile unit further includes a cell barrier having a height lower than a height of the plurality of tactile sensation providers and provided along the perimeter of the cell.

12. The tactile sensation supply device of claim 1, wherein the magnetic field generator is at a location and in a shape corresponding to the plurality of the tactile sensation providers,
  wherein the plurality of tactile sensation providers is transformed in response to a magnetic field generated by the magnetic field generator, and
  wherein a tactile sensation is transferred by the transformation of the plurality of tactile sensation providers.

13. The tactile sensation supply device of claim 1, wherein at least one of the degree, direction, and frequency of the transformation from the first shape to the second shape is controlled by controlling at least one of the intensity, direction, and frequency of the magnetic field generated by the magnetic field generator.

14. The tactile sensation supply device of claim 1, wherein the magnetic particles includes at least one of iron (Fe), cobalt (Co) and nickel (Ni).

15. The tactile sensation supply device of claim 1, wherein the matrix material is made of rubber or a polymer.

* * * * *